(12) United States Patent
Zegelin

(10) Patent No.: US 7,127,258 B2
(45) Date of Patent: Oct. 24, 2006

(54) WLAN ROAMING BASED ON LOCATION

(75) Inventor: Chris Zegelin, San Jose, CA (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 10/705,277

(22) Filed: Nov. 10, 2003

(65) Prior Publication Data

US 2005/0185615 A1    Aug. 25, 2005

(51) Int. Cl.
*H04Q 7/20* (2006.01)
(52) U.S. Cl. ............... 455/456.1; 455/437; 455/438; 455/456.5; 455/456.6; 455/432.1; 455/435.1; 455/41.2; 370/328; 370/338; 701/207
(58) Field of Classification Search .......... 455/103, 455/437–438, 456.1–457, 432.1, 435.1, 41.2, 455/450–451, 452.1, 453, 455; 370/328, 370/338; 701/207; 342/357.08, 451
See application file for complete search history.

(56) References Cited

U.S. PATENT DOCUMENTS

| | | | | |
|---|---|---|---|---|
| 5,596,333 | A * | 1/1997 | Bruckert | 342/457 |
| 5,848,358 | A * | 12/1998 | Forssen et al. | 455/437 |
| 6,259,898 | B1 * | 7/2001 | Lewis | 455/103 |
| 6,664,925 | B1 * | 12/2003 | Moore et al. | 342/451 |
| 2002/0087264 | A1 * | 7/2002 | Hills et al. | 701/207 |
| 2002/0097182 | A1 * | 7/2002 | Goren et al. | 342/357.07 |
| 2003/0036386 | A1 * | 2/2003 | Harrison | 455/438 |
| 2003/0112820 | A1 * | 6/2003 | Beach | 370/465 |
| 2003/0118015 | A1 * | 6/2003 | Gunnarsson et al. | 370/389 |
| 2004/0052232 | A1 * | 3/2004 | Ramaswamy et al. | 370/338 |
| 2004/0095902 | A1 * | 5/2004 | Laroia et al. | 370/328 |
| 2004/0203869 | A1 * | 10/2004 | Annamalai | 455/456.1 |
| 2004/0203872 | A1 * | 10/2004 | Bajikar | 455/456.1 |
| 2004/0203873 | A1 * | 10/2004 | Gray | 455/456.1 |

OTHER PUBLICATIONS

Copy of copending U.S. Appl. No. 09/528,697, filed Mar. 17, 2000.
*User Location and Tracking in an In-Building Radio Network*, by Paramvir Bahl and Venkata N. Padmanabhan, Microsoft Technical Report MSR-TR-99-12, dated Feb. 1999, by the same authors, published by Microsoft Research.
Bahl et al., "User Location And Tracking In An In-Building Radion Network," Microsoft Research, Technical Report, MSR-TR-99-12, Feb. 1999.
Bahl et al., "Enhancements To The Radar User Location And Tracking System," Microsoft Research, Technical Report, MSR-TR-2000-12, Feb. 2000.

\* cited by examiner

*Primary Examiner*—Steve M. D'Agosta
(74) *Attorney, Agent, or Firm*—Baker Botts LLP

(57) ABSTRACT

A wireless data communications system has mobile units which become associated with access points. Association between a mobile unit and an access point is changed as mobile units move within an area having a plurality of access points. Selection of an access point for association with a mobile unit is made according to selection criteria including a plurality of selection parameters. The system includes arrangements for determining location of a mobile unit within the area. The selection parameters include location of the mobile unit or direction of movement of the mobile unit when there are a plurality of access points available for association with the mobile unit.

4 Claims, 3 Drawing Sheets

WLAN ROAMING BASED ON LOCATION

This invention relates to wireless data communications systems and particularly to wireless data communications systems which include arrangements for locating mobile units within the area serviced by the system.

BACKGROUND OF THE INVENTION

The use of mobile data communications systems to perform location functions for locating mobile units is described in articles entitled *Enhancements to the User Location and Tracking System*, by Paramvir Bahl and Venkata N. Padmanabhan, and *User Location and Tracking in an In-Building Radio Network*, Microsoft Technical Report MSR-TR-99-12, dated February 1999, by the same authors, both published by Microsoft Research. As described therein signal strength of signals of the wireless data communications system, such as a system using the protocol of IEEE Standard 802.11, are used for locating mobile units within an area serviced by the system. Other techniques for locating mobile units using the wireless data communications system or other location system are possible.

In co-pending application Ser. No. 09/528,697, filed Mar. 17, 2000, which is incorporated herein by reference, there is described a system which follows the protocol of IEEE Standard 802.11, but which uses a combination of RF Ports and Cell Controllers to perform the functions of Access points of a classical 802.11 data communications system. Lower level MAC functions are performed by the RF Ports and higher level MAC functions, including association and roaming functions, are performed by the cell controller. The term "access point" as used herein is intended to include conventional access points, such as those which follow the protocol of IEEE Standard 802.11 and perform all MAC functions, as well as RF Ports operating with cell controllers, as described in the incorporated co-pending application.

It is an object of the present invention to provide an improved method of controlling association and roaming functions in a wireless data communications system which includes arrangements for locating mobile units.

SUMMARY OF THE INVENTION

The present invention is an improvement in a wireless data communications system wherein mobile units become associated with access points, and wherein association between a mobile unit and an access point is changed as mobile units move within an area having a plurality of access points. Selection of an access point for association with a mobile unit is made according to selection criteria including a plurality of selection parameters. The system includes arrangements for determining location of a mobile unit within the area. According to the improvement the selection parameters include location of the mobile unit when there are a plurality of access points available for association with the mobile unit.

The improvement is most advantageous where the access points are RF Ports associated with a cell controller and wherein association functions are performed in the cell controller. In a preferred arrangement the cell controller monitors traffic volume for the access points and wherein the selection parameters include range from the mobile unit to the access points, signal strength from the mobile unit to the access points and traffic volume for the access points. The selection parameters may further include direction of change of location of the mobile unit.

The invention is an improvement in a Wire data communications system wherein mobile units become associated with access points, and wherein association between a mobile unit and an access point is changed as mobile units move within an area having a plurality of access points. Selection of an access point for association with a mobile unit is made according to selection criteria including a plurality of selection parameters. The system includes arrangements for determining direction of change of location of a mobile unit within the area. According to the improvement the selection criteria includes direction of change of location of the mobile unit when there are a plurality of access points available for association with the mobile unit.

Where the access points are RF Ports associated with a cell controller, association functions are performed in said cell controller. In a preferred arrangement the cell controller monitors traffic volume for the access points and the selection parameters include change of range from the mobile unit to the access points, signal strength from the mobile unit to the access points and traffic volume for the access points.

In accordance with the invention there is provided a method for use in a wireless data communications system wherein mobile units within an area become associated with access points, and wherein the system includes arrangements for determining location of a mobile unit within the area. Collisions of packets transmitted by the mobile units to an associated access point are avoided by assigning mobile units in a selected portion of the area to another access point.

In accordance with the invention there is provided a method for use in a wireless data communications system wherein mobile units within an area become associated with access points, and wherein the system includes arrangements for determining location of a mobile unit within the area. Collisions of packets transmitted by said mobile units to an associated access point are avoided by assigning mobile units in a first selected portion of the area to a first channel and assigning mobile units in a second selected portion of the area to a different channel.

For a better understanding of the present invention, together with other and further objects thereof, reference is made to the following description, taken in conjunction with the accompanying drawings, and its scope will be pointed out in the appended claims.

DESCRIPTION OF THE INVENTION

Figure 1:
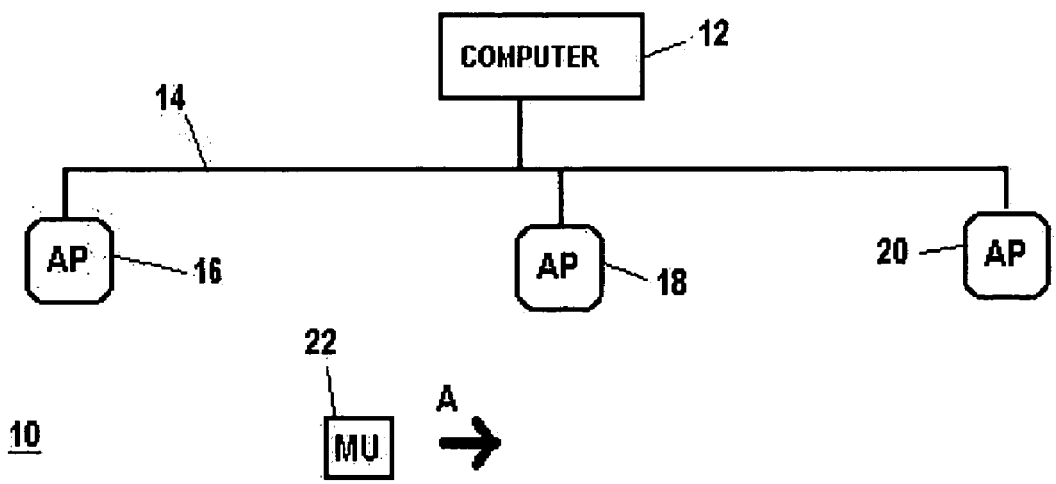
FIG. 1 is a block diagram showing a system in which the improvement of the present invention may be applied.

Referring to FIG. 1 there is shown a system 10 for carrying out wireless data communications between a computer 12 and mobile units 22, using a protocol such as IEEE Standard 802.11. Computer 12 is connected by a wired network 14 to access points 16, 18. It should be understood that there may be many access points in a typical system, as well as many mobile units. Further there may be more than one computer 12 connected to network 14. Computer 12 may, in one arrangement act as a cell controller as described in the referenced co-pending application, in which case access points 16, 18 and 20 would be RF Ports.

In addition to providing wireless mobile communications, the system 10 is arranged to automatically determine the location of mobile units 22. This may be done using the data communications signals, for example by comparing signal strength of mobile unit signals received at the access points to a database that relates signal strength to location within the area serviced by system 10. Location determination may also be based on the signal strength of access point signals, such as beacon signals received by the mobile units. Such systems may include beacon transmitting devices at selected locations that transmit access point-like beacon signals but do not handle data communications and therefore need not be connected to computer 12 via wired network 14. Alternately, other techniques may be used to determine the location of mobile units 22 and to provide location information to computer 12.

According to the invention the location information available in computer 12 is advantageously used to enhance the association and roaming functions of the wireless data communications system.

Typically association decisions are initially made by mobile units which monitor beacon signals sent from access points. An initial decision on requesting association with an access point can be based on the signal strength of the beacon signals from the available access points that are within range of the mobile unit. The mobile unit can detect signal strength using the RSSI function and will usually request association with the access point whose signal has the greatest signal level at the mobile unit. The access points have the ability to refuse association. The decision on association may be based on selection parameters such as signal strength, traffic volume currently handled by an access point, and user priority. If an access point or a computer controlling the access point such as a cell controller, does not want to grant association to a mobile unit association can be refused and the mobile unit will thereafter request association with another access point.

As an example, all access points which receive the association request from the mobile unit can be rated by a cell controller according to a score, where each factor contributing to the score is numerically rated for each access point, the numerical ratings are added and the total scores are compared to select the appropriate access point. There may also be some conditions on selection of an access point. Some access points may be overloaded and may refuse any new associations. In other cases associations may be refused except for emergency or security access.

The availability of mobile unit location as a factor in selecting an access point for association adds additional possibilities. For example, a mobile unit may receive a stronger signal from one access point and be geographically closer to a different access point. This can happen in an indoor environment wherein multi-path signals can provide signal hot spots and signal dead zones. A mobile unit in a hot spot of one access point may be geographically closer to another access point from which it receives a weaker signal. It may be appropriate to select the closer access point for association however, since a small movement may cause the signal of the more distant access point to be lost, because of a difference in the multi-path propagation. In this event the mobile unit may lose communication and need to perform a new association process.

According to the present invention two additional parameters are available for evaluation and use in connection with selecting an access point for association with a mobile unit.

The first parameter is proximity of the mobile unit to the access point. This factor can be evaluated based on location of the access points and a computed range between the mobile unit and each access point, or other determination of location of the access point. Proximity can be used along with other parameters such as signal strength, access point traffic loading and priority in connection with selecting an access point for association.

The second parameter which can be used in combination with the prior art factors, or in combination with range between mobile unit and access point, is the relative movement of the mobile unit with respect to the access point. This is effectively an indication of the direction of movement of the mobile unit and can be determined by the difference between positions for the mobile unit in sequential location determinations. When considered with respect to the locations of the access points it is significant with respect to selection of an access point to determine if a mobile unit is stationary or is moving toward or away from the access point.

Figure 2:
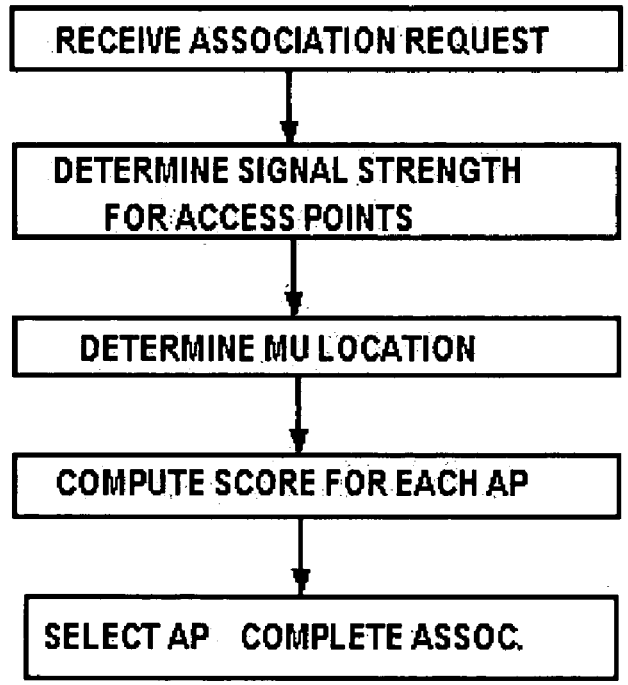
FIG. 2 is a flow diagram illustrating a first embodiment of a method in accordance with the present invention.
Figure 3:
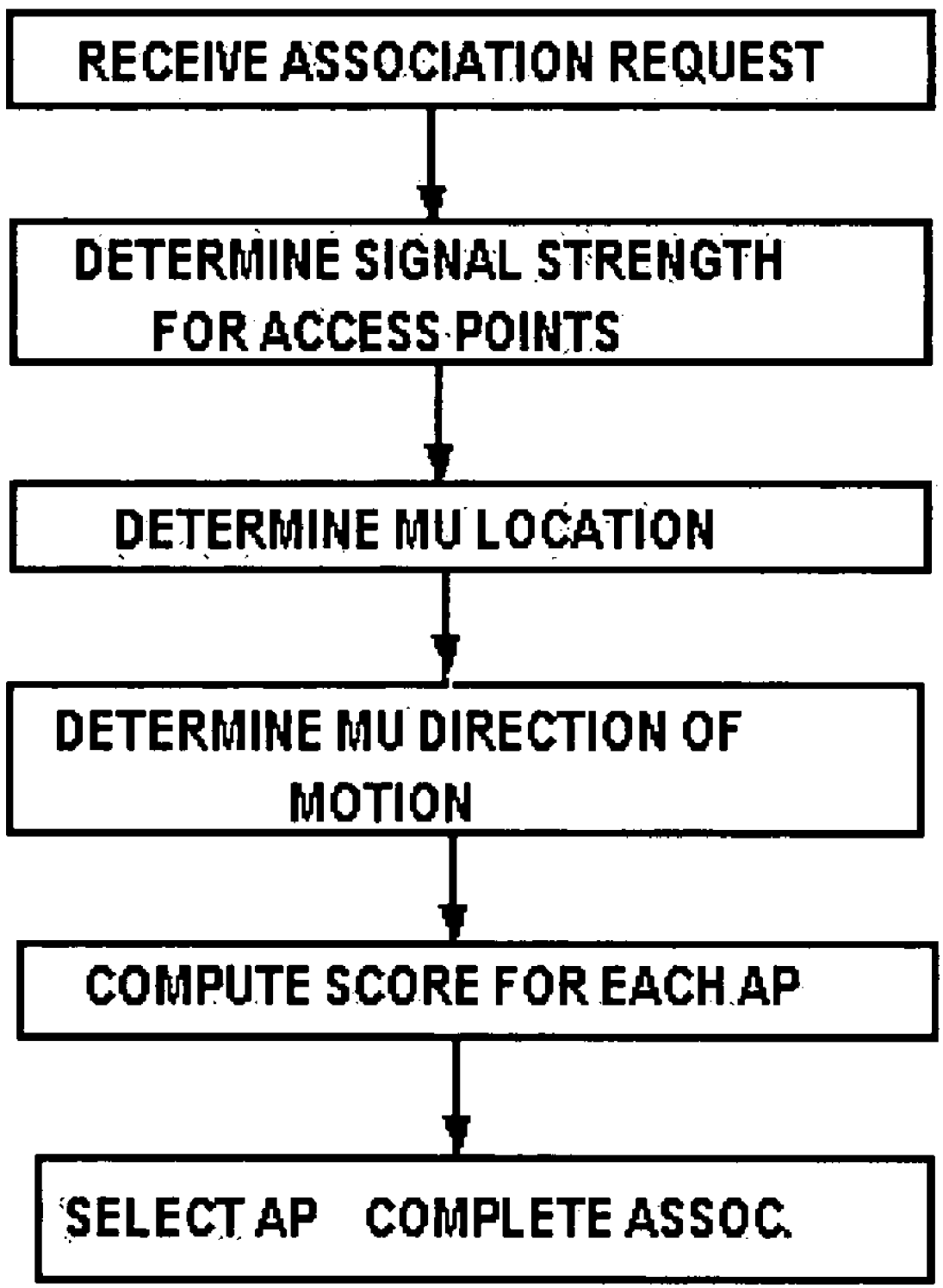
FIG. 3 is a flow diagram illustrating a second embodiment of a method in accordance with the present invention.

FIGS. 2 and 3 illustrate flow diagrams for two exemplary embodiments of the method of the invention. In the example of FIG. 2, signal strengths for transmissions between a mobile unit and access points is determined and may be used to evaluate the merits of selecting an access point and also to locate the mobile unit. A score can be computed for each access point, for example, considering parameters such as signal strength and location. An access point is selected for association based on the computed score, and association is completed.

In the embodiment of FIG. 3 the process includes an additional step of determining the direction of movement of the mobile unit, for example whether it is moving toward or away from an access point. A score is computed using the direction of motion as an additional parameter, along with signal strength and range, to select an access point for association.

Figure 4:
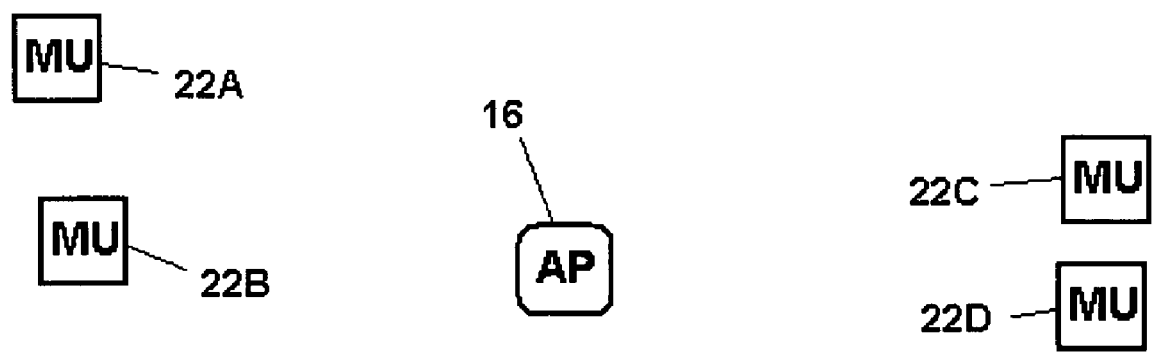
FIG. 4 is a diagram illustrating a third embodiment of a method in accordance with the present invention.
Figure 4:
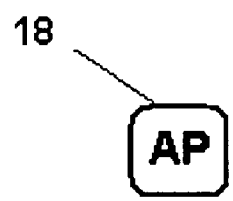

Referring to FIG. 4 there is illustrated an arrangement of mobile units and access points that can give rise to a situation called a "hidden node". The hidden node arises when mobile units 22A and 22B are located in a first portion of an area and are associated with the same access point 16 that is also communicating with mobile units 22C and 22D in a second portion of the area. Mobile units 22A and 22B are too far from mobile units 22C and 22D to receive their transmissions in order to avoid collisions of packets corresponding to transmissions of the mobile units. As a result collisions occur requiring retransmissions which degrades the capacity of the system.

In accordance with one method according to the invention, collisions are avoided by assigning mobile units in a selected portion of the area, such as mobile units 22C and 22D to a different access point, such as access point 18, where the reassignment is based on the location determined for each mobile unit.

In accordance with another method, collisions are avoided by assigning channels to the mobile units for communications with access point 16 in accordance with the location of the mobile units. According to this method, mobile units 22A and 22B, located in a first selected portion of the area, such as to the left of access point 16 are assigned to a first channel and mobile units 22C and 22D, located in a second selected portion of the area are assigned to a second channel.

While there have been described what are believed to be the preferred embodiments of the invention, those skilled in the art will recognize that other and further changes and modifications may be made thereto without departing from the spirit of the invention, and it is intended to claim all such changes and modifications as fall within the true scope of the invention.

I claim:

1. In a wireless data communications system wherein mobile units become associated with access points, and wherein association between a mobile unit and an access point is changed as mobile units move within an area having a plurality of access points, and wherein selection of an access point for association with a mobile unit is made according to selection criteria including a plurality of selection parameters, and wherein said system includes arrangements for determining location of a mobile unit within said area, and wherein said selection parameters include location of said mobile unit when there are a plurality of access points available for association with said mobile unit, and wherein said access points are RF Ports associated with a cell controller and wherein association functions are performed in said cell controller, the improvement wherein said cell controller monitors traffic volume for said access points and wherein said selection parameters include range from said mobile unit to said access points, signal strength from said mobile unit to said access points and traffic volume for said access points.

2. In a wireless data communications system wherein mobile units become associated with access points, and wherein association between a mobile unit and an access point is changed as mobile units move within an area having a plurality of access points, and wherein selection of an access point for association with a mobile unit is made according to selection criteria including a plurality of selection parameters, and wherein said system includes arrangements for determining direction of change of location of a mobile unit within said area, and wherein said selection criteria includes direction of change of location of said mobile unit when there are a plurality of access points available for association with said mobile unit, and wherein said access points are RF Ports associated with a cell controller and wherein association functions are performed in said cell controller, the improvement wherein said cell controller monitors traffic volume for said access points and wherein said selection parameters include change of range from said mobile unit to said access points, signal strength from said mobile unit to said access points and traffic volume for said access points.

3. In a wireless data communications system wherein mobile units become associated with access points, and wherein association between a mobile unit and an access unit is changed as mobile units move within an area having a plurality of access points, and wherein selection of an access point for association with a mobile unit is made according to selection criteria including a plurality of selection parameters, and wherein said system includes arrangements for determining location of a mobile unit within said area, the improvement wherein said selection parameters include location of said mobile unit when there are a plurality of access points available for association with said mobile unit, wherein said access points are RF Ports associated with a cell controller, and wherein RF Ports perform lower level MAC functions and the cell controller performs higher level MAC functions, including at least association.

4. In a wireless data communications system wherein mobile units become associated with access points, and wherein association between a mobile unit and an access unit is changed as mobile units move within an area having a plurality of access points, and wherein selection of an access point for association with a mobile unit is made according to selection criteria including a plurality of selection parameters, and wherein said system includes arrangements for determining direction of change of a mobile unit within said area, the improvement wherein said selection parameters includes direction of change of location of said mobile unit when there are a plurality of access points available for association with said mobile unit, wherein said access points are RF Ports associated with a cell controller, and wherein RF Ports perform lower level MAC functions and the cell controller performs higher level MAC functions, including at least association.

* * * * *